US012573200B2

(12) United States Patent
Park et al.

(10) Patent No.: US 12,573,200 B2
(45) Date of Patent: Mar. 10, 2026

(54) VIDEO-BASED BEHAVIOR RECOGNITION DEVICE AND OPERATION METHOD THEREFOR

(71) Applicant: SOGANG UNIVERSITY RESEARCH BUSINESS DEVELOPMENT FOUNDATION, Seoul (KR)

(72) Inventors: Hyung Min Park, Seoul (KR); Min Seok Kang, Seoul (KR); Rae Hong Park, Seoul (KR)

(73) Assignee: SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 297 days.

(21) Appl. No.: 18/263,261

(22) PCT Filed: Nov. 1, 2021

(86) PCT No.: PCT/KR2021/015513
§ 371 (c)(1),
(2) Date: Jul. 27, 2023

(87) PCT Pub. No.: WO2022/163972
PCT Pub. Date: Aug. 4, 2022

(65) Prior Publication Data
US 2024/0087318 A1 Mar. 14, 2024

(30) Foreign Application Priority Data
Jan. 29, 2021 (KR) ........................ 10-2021-0012863

(51) Int. Cl.
*G06V 20/40* (2022.01)
*G06V 10/56* (2022.01)
(Continued)

(52) U.S. Cl.
CPC .............. *G06V 20/44* (2022.01); *G06V 10/56* (2022.01); *G06V 10/82* (2022.01); *G06V 20/52* (2022.01)

(58) Field of Classification Search
CPC ........ G06V 10/56; G06V 10/80; G06V 10/82; G06V 20/44; G06V 20/52; G06N 3/0464
See application file for complete search history.

(56) References Cited

U.S. PATENT DOCUMENTS

| | | | |
|---|---|---|---|
| 8,345,984 B2 * | 1/2013 | Ji | G06N 3/045 |
| | | | 382/156 |
| 10,482,334 B1 * | 11/2019 | Chen | G06F 18/2155 |
| 2013/0308856 A1 | 11/2013 | Carpenter et al. | |

FOREIGN PATENT DOCUMENTS

| | | |
|---|---|---|
| KR | 10-2016-0032466 A | 3/2016 |
| KR | 10-2019-0054702 A | 5/2019 |

OTHER PUBLICATIONS

Computer English Translation of Chinese Patent No. CN 111462183 A). (Year: 2020).*

(Continued)

*Primary Examiner* — Daniel G Mariam
(74) *Attorney, Agent, or Firm* — ArentFox Schiff LLP; Yun H. Choe

(57) ABSTRACT

The present disclosure provides a video-based behavior recognition device comprising a synthesized channel frame provision unit generating highlight information by comparing channel frames corresponding to the respective channels among a plurality of channels and synthesizing the channel frames and the highlight information to provide a synthesized channel frame, a neural network unit providing a middle frame on the basis of the synthesized channel frame and a multi-frame convolution neural network, and a behavior recognition result provision unit providing a behavior recognition result on the basis of the middle frame and a (Continued)

weighted value generated according to the middle frame, and a method operating thereof. In the present disclosure, the behavior recognition result is provided on the basis of the multi-frame convolution neural network and the synthesized channel frame synthesized from the channel frames provided for the respective channels, and, thereby, an event occurrence in a video is more effectively detected.

16 Claims, 11 Drawing Sheets

(51) Int. Cl.
    *G06V 10/82*         (2022.01)
    *G06V 20/52*         (2022.01)

(56) References Cited

OTHER PUBLICATIONS

International Search Report for International Application No. PCT/KR2021/015513 dated Feb. 8, 2022, ISA/KR.

Hu, Jie et al., Squeeze-and-Excitation Networks. [https://arxiv.org/abs/1 709.01507vl], Sep. 5, 2017, Retrieved on Jan. 10, 2022], pp. 1-11.

Li, Ji et al. Efficient Violence Detection Using 3D Convolutional Neural Networks, Shanghai Jiao Tong University, Oct. 1, 2020, Retrieved on Jan. 10, 2022, pp. 1-8, [https://doi.org/10.1109/AVS S.2019.8909883].

Kang, Min-Seok et al., Efficient Spatio-Temporal Modeling Methods for Real-Time Violence Recognition. IEEE Access, Jun. 1, 2021, Retrieved on Jan. 10, 2022, pp. 76270-76285, vol. 9, Retrieved from [https://doi.org/10.1109/ACC ESS.2021.3083273].

\* cited by examiner

FIG. 1

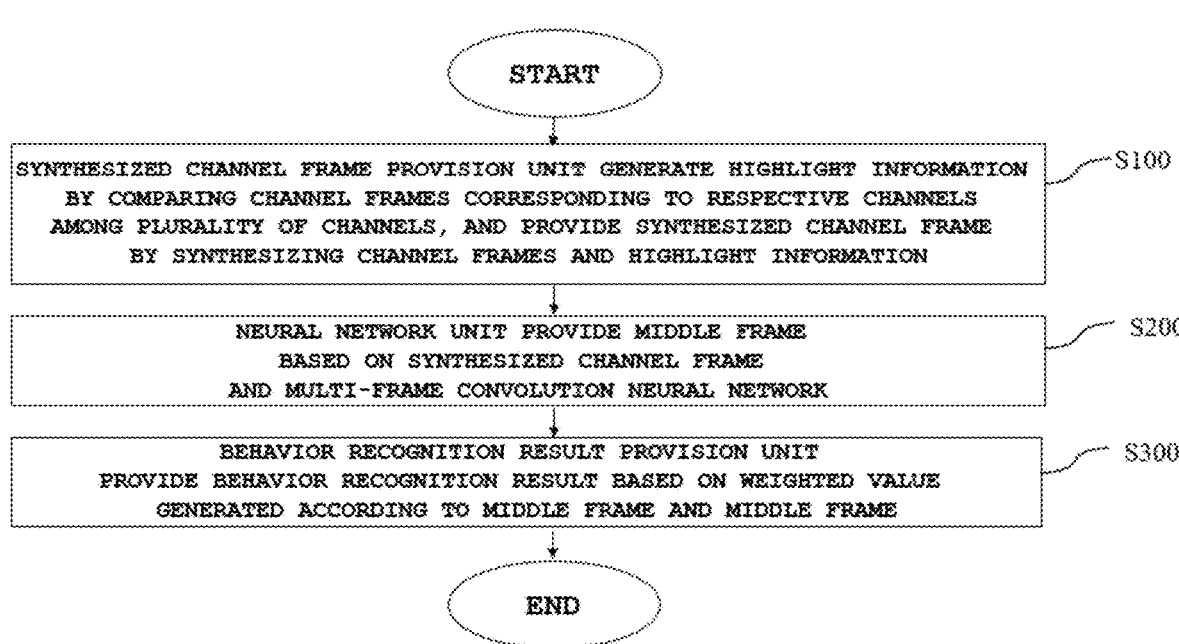

START

SYNTHESIZED CHANNEL FRAME PROVISION UNIT GENERATE HIGHLIGHT INFORMATION BY COMPARING CHANNEL FRAMES CORRESPONDING TO RESPECTIVE CHANNELS AMONG PLURALITY OF CHANNELS, AND PROVIDE SYNTHESIZED CHANNEL FRAME BY SYNTHESIZING CHANNEL FRAMES AND HIGHLIGHT INFORMATION — S100

NEURAL NETWORK UNIT PROVIDE MIDDLE FRAME BASED ON SYNTHESIZED CHANNEL FRAME AND MULTI-FRAME CONVOLUTION NEURAL NETWORK — S200

BEHAVIOR RECOGNITION RESULT PROVISION UNIT PROVIDE BEHAVIOR RECOGNITION RESULT BASED ON WEIGHTED VALUE GENERATED ACCORDING TO MIDDLE FRAME AND MIDDLE FRAME — S300

END

<u>10</u>

| 100 | 200 | 300 |

MULTI-FRAME CONVOLUTION NEURAL NETWORK (220)

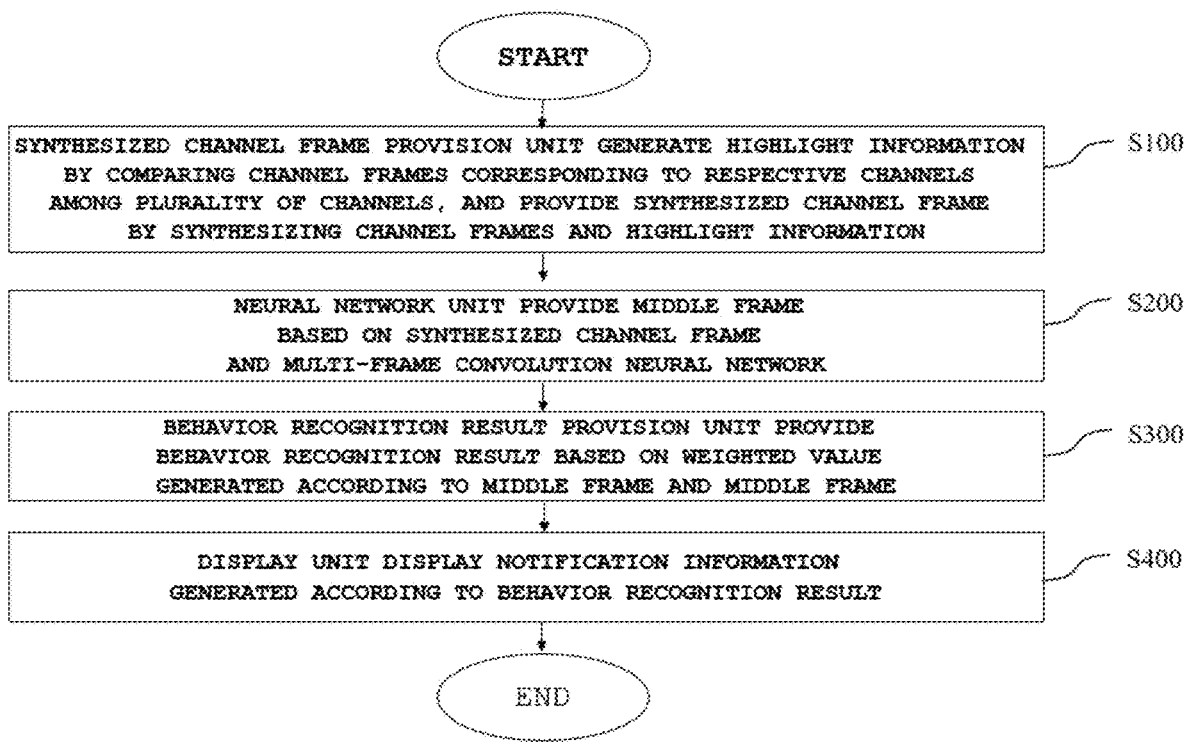

START

SYNTHESIZED CHANNEL FRAME PROVISION UNIT GENERATE HIGHLIGHT INFORMATION
BY COMPARING CHANNEL FRAMES CORRESPONDING TO RESPECTIVE CHANNELS
AMONG PLURALITY OF CHANNELS, AND PROVIDE SYNTHESIZED CHANNEL FRAME
BY SYNTHESIZING CHANNEL FRAMES AND HIGHLIGHT INFORMATION — S100

NEURAL NETWORK UNIT PROVIDE MIDDLE FRAME
BASED ON SYNTHESIZED CHANNEL FRAME
AND MULTI-FRAME CONVOLUTION NEURAL NETWORK — S200

BEHAVIOR RECOGNITION RESULT PROVISION UNIT PROVIDE
BEHAVIOR RECOGNITION RESULT BASED ON WEIGHTED VALUE
GENERATED ACCORDING TO MIDDLE FRAME AND MIDDLE FRAME — S300

DISPLAY UNIT DISPLAY NOTIFICATION INFORMATION
GENERATED ACCORDING TO BEHAVIOR RECOGNITION RESULT — S400

END

<u>20</u>

VIDEO-BASED BEHAVIOR RECOGNITION DEVICE AND OPERATION METHOD THEREFOR

CROSS-REFERENCE TO RELATED APPLICATION

This application is a 371 U.S. national stage of PCT/KR2021/015513, filed Nov. 1, 2021, which claims the benefit of Korean Patent Application No. 10-2021-0012863, filed Jan. 29, 2021, the contents of each of which are incorporated herein by reference.

TECHNICAL FIELD

The present invention relates to a video-based behavior recognition device and an operation method thereof.

BACKGROUND ART

Recently, the use of a closed circuit television (CCTV) for crime prevention around residential areas or buildings has been rapidly increasing. However, constantly monitoring videos provided from the CCTV by persons may cause a waste of money and time. In order to solve such a problem, various researches are being conducted.

DISCLOSURE

Technical Problem

The technical problem to be achieved by the present invention provides an operation method for a video-based behavior recognition device capable of more effectively detecting an event occurrence in a video by providing a behavior recognition result based on a synthesized channel frame synthesized from channel frames provided for the respective channels and a multi-frame convolution neural network.

Technical Solution

In an operation method for a video-based behavior recognition device according to an embodiment of the present invention, a synthesized channel frame provision unit may generate highlight information by comparing channel frames corresponding to respective channels among a plurality of channels, and provide a synthesized channel frame by synthesizing the channel frames and the highlight information. A neural network unit may provide a middle frame based on the synthesized channel frame and a multi-frame convolution neural network. A behavior recognition result provision unit may provide a behavior recognition result based on a weighted value generated according to the middle frame and the middle frame.

In an embodiment, the neural network unit may include a gray synthesized frame generation unit and a multi-frame convolution neural network. The gray synthesized frame generation unit may generate a gray synthesized frame by synthesizing the synthesized channel frames respectively corresponding to the plurality of channels. The multi-frame convolution neural network may generate the middle frame based on the gray synthesized frame.

In an embodiment, the plurality of channels may include a first channel, a second channel, and a third channel. The first channel may be a red channel, the second channel may be a green channel, and the third channel may be a blue channel.

In an embodiment, the gray synthesized frame generation unit may generate the gray synthesized frame by synthesizing a red synthesized channel frame corresponding to the red channel, a green synthesized channel frame corresponding to the green channel, and a blue synthesized channel frame corresponding to the blue channel.

In an embodiment, the gray synthesized frame generation unit may generate the gray synthesized frame by synthesizing the red synthesized channel frame, the green synthesized channel frame, and the blue synthesized channel frame respectively corresponding to a plurality of times. The gray synthesized frame generation unit may configure the gray synthesized frames corresponding to three consecutive times among the plurality of times as one input unit, and provide the one input unit to the multi-frame convolution neural network.

In an embodiment, the behavior recognition result provision unit may generate pooling data by performing average pooling on the middle frame. The behavior recognition result provision unit may generate the weighted value based on the pooling data, and provide the behavior recognition result based on the weighted value.

In an embodiment, the behavior recognition result provision unit may include a first pooling unit and a second pooling unit. The first pooling unit may generate middle pulling data by performing average pooling on each of the middle frames along a spatial axis. The second pooling unit may provide the pooling data by performing average pooling on the middle pulling data along a channel axis.

In an embodiment, the behavior recognition result provision unit may provide the behavior recognition result based on the middle pulling data and the weighted value.

A video-based behavior recognition device according to an embodiment of the present invention may include a synthesized channel frame provision unit, a neural network unit, and a behavior recognition result provision unit. The synthesized channel frame provision unit may generate highlight information by comparing channel frames corresponding to respective channels among a plurality of channels, and provide a synthesized channel frame by synthesizing the channel frames and the highlight information. The neural network unit may provide a middle frame based on the synthesized channel frame and a multi-frame convolution neural network. The behavior recognition result provision unit may provide a behavior recognition result based on a weighted value generated according to the middle frame and the middle frame.

In an embodiment, the neural network unit may generate a gray synthesized frame by synthesizing the synthesized channel frames respectively corresponding to the plurality of channels.

In an operation method for a video-based behavior recognition system according to an embodiment of the present invention, a synthesized channel frame provision unit may generate highlight information by comparing channel frames corresponding to respective channels among a plurality of channels, and provide a synthesized channel frame by synthesizing the channel frames and the highlight information. A neural network unit may provide a middle frame based on the synthesized channel frame and a multi-frame convolution neural network. A behavior recognition result provision unit may provide a behavior recognition result based on a weighted value generated according to the middle frame and the middle frame. A display unit may display notification information generated according to the behavior recognition result.

In an embodiment, the neural network unit may include a gray synthesized frame generation unit and a multi-frame convolution neural network. The gray synthesized frame generation unit may generate a gray synthesized frame by synthesizing the synthesized channel frames respectively corresponding to the plurality of channels. The multi-frame convolution neural network may generate the middle frame based on the gray synthesized frame.

A video-based behavior recognition system according to an embodiment of the present invention may include a synthesized channel frame provision unit, a neural network unit, a behavior recognition result provision unit, and a display unit. The synthesized channel frame provision unit may generate highlight information by comparing channel frames corresponding to respective channels among a plurality of channels, and provide a synthesized channel frame by synthesizing the channel frames and the highlight information. The neural network unit may provide a middle frame based on the synthesized channel frame and a multi-frame convolution neural network. The behavior recognition result provision unit may provide a behavior recognition result based on a weighted value generated according to the middle frame and the middle frame. The display unit may display notification information generated according to the behavior recognition result.

In an embodiment, the plurality of channels may include a first channel, a second channel, and a third channel. The first channel may be a red channel, the second channel may be a green channel, and the third channel may be a blue channel.

In addition to the technical problems of the present invention mentioned above, other features and advantages of the present invention will be described below or will be clearly understood by those of ordinary skill in the art from such description and explanation.

Advantageous Effects

According to the present invention as described above, the effect is as follows.

In the operation method for a video-based behavior recognition device, according to the present invention, the behavior recognition result is provided based on the synthesized channel frame synthesized from the channel frames provided for the respective channels and the multi-frame convolution neural network, thereby more effectively detecting an event occurrence in a video.

In addition, in the operation method for a video-based behavior recognition device, according to the present invention, the 3-channel image is converted into the 1-channel image and input to the multi-frame convolution neural network (2D CNN), and thus, the amount of computation for real-time recognition may be reduced by about ⅓ times compared to the 2D CNN of the related art, thereby enhancing the performance of behavior recognition.

In addition, other features and advantages of the present invention may be newly identified through embodiments of the present invention.

DESCRIPTION OF DRAWINGS

FIG. 1 is a flowchart illustrating an operation method for a video-based behavior recognition device according to embodiments of the present invention.

FIG. 4 is a diagram for explaining an example of an operation of the video-based behavior recognition device of FIG. 1.

FIG. 10 is a flowchart illustrating an operation method of a video-based behavior recognition system according to embodiments of the present invention.

BEST MODE

Figure 2:
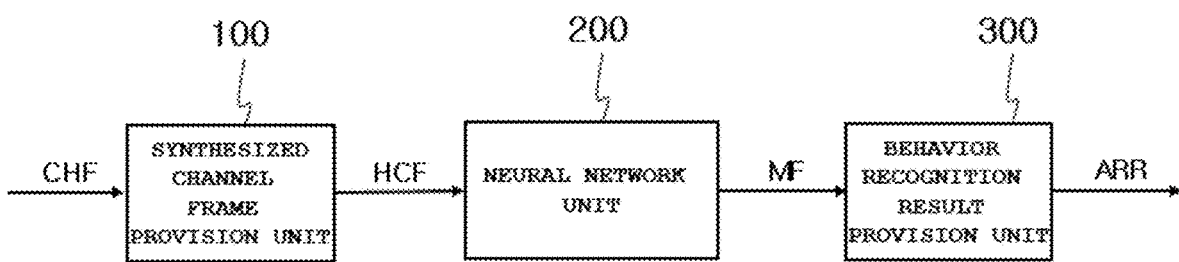
FIG. 2 is a diagram illustrating a video-based behavior recognition device according to embodiments of the present invention.

In the present specification, it should be noted that, in adding reference numerals to components of each drawing, the same numerals are used only for the same components even though the same components are shown in different drawings.

On the other hand, the meaning of the terms described in the present specification should be understood as follows.

The singular expression should be understood as including the plural expression unless the context clearly defines otherwise, and the scope of rights should not be limited by these terms.

It should be understood that terms such as "comprise" or "have" do not preclude the possibility of addition or existence of one or more other features or numbers, steps, operations, components, parts, or combinations thereof.

Hereinafter, preferred embodiments of the present invention designed to solve the above problem will be described in detail with reference to the accompanying drawings.

Figure 3:
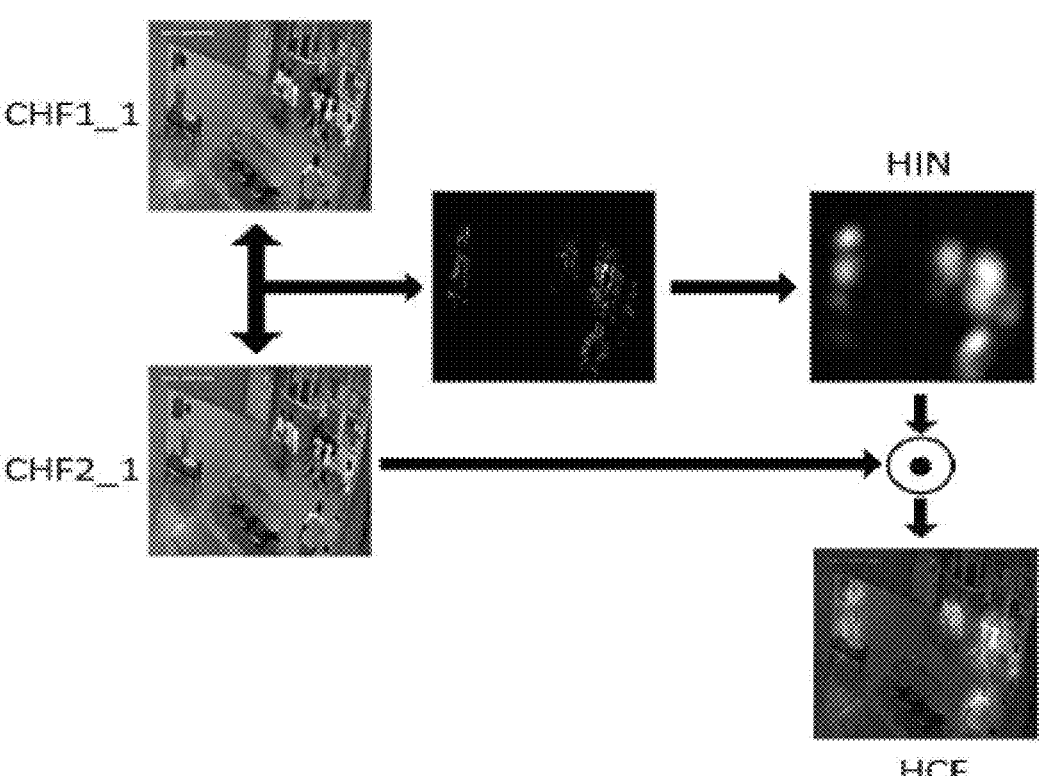
FIG. 3 is a diagram for explaining the operation of a synthesized channel frame provision unit included in the video-based behavior recognition device of FIG. 2.
Figure 4:
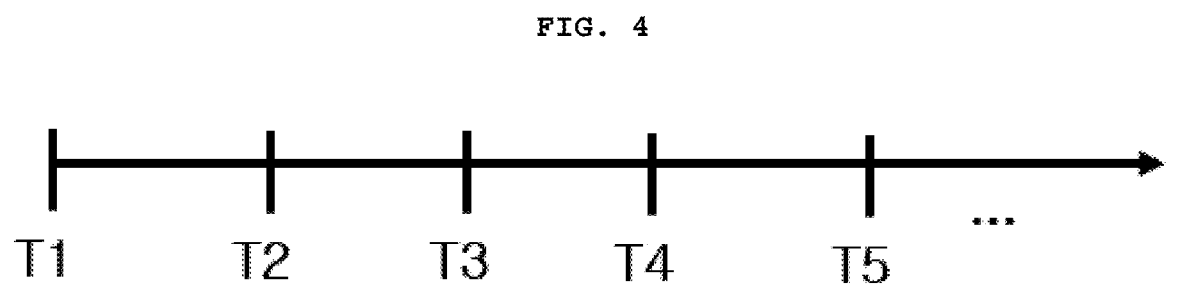

FIG. 1 is a flowchart illustrating an operation method for a video-based behavior recognition device according to embodiments of the present invention. FIG. 2 is a diagram illustrating a video-based behavior recognition device according to embodiments of the present invention. FIG. 3 is a diagram for explaining the operation of a synthesized channel frame provision unit included in the video-based behavior recognition device of FIG. 2. FIG. 4 is a diagram for explaining an example of an operation of the video-based behavior recognition device of FIG. 1.

Referring to FIGS. 1 to 4, a video-based behavior recognition device 10 according to an embodiment of the present invention may include a synthesized channel frame provision unit 100, a neural network unit 200, and a behavior recognition result provision unit 300. In the operation method for the video-based behavior recognition device 10 according to an embodiment of the present invention, the synthesized channel frame provision unit 100 may generate highlight information HIN by comparing channel frames CHF corresponding to respective channels among a plurality of channels, and provide a synthesized channel frame HCF by synthesizing the channel frames CHF and the highlight information HIN (S100). For example, a plurality of times may include a first time T1, a second time T2, a third time T3, and a fourth time T4, and the plurality of channels may include a first channel C1, a second channel C2, and a third channel C3. The first channel C1 may be a red channel, the second channel C2 may be a green channel, and the third channel C3 may be a blue channel. A first channel frame corresponding to the first channel C1 may be a red image among RGB images, a second channel frame corresponding to the second channel C2 may be a green image among the RGB images, and a third channel frame corresponding to the third channel C3 may be a blue image among the RGB images.

For example, the synthesized channel frame provision unit 100 included in the video-based behavior recognition device 10 may generate the highlight information HIN by comparing a first channel frame CHF1_1 of the first time T1 among the plurality of times with a first channel frame CHF2_1 of the second time T2, and may generate the highlight information HIN by comparing a second channel frame CHF1_2 of the first time T1 with a second channel frame CHF2_2 of the second time T2. In addition, the synthesized channel frame provision unit 100 may generate the highlight information HIN by comparing by comparing a third channel frame CHF1_3 of the first time T1 with a third channel frame CHF2_3 of the second time T2 among the plurality of times. After calculating the Euclidean distance between the channel frames CHF, the synthesized channel frame provision unit 100 may generate the highlight information HIN that may focus on a moving object by using convolution and pooling layers. In this case, the synthesized channel frame provision unit 100 may generate the synthesized channel frame HCF by synthesizing the channel frames CHF and the highlight information HIN. For example, the synthesized channel frame provision unit 100 may provide a first synthesized channel frame HCF1_C1 of the first time T1 by synthesizing the highlight information HIN with the first channel frame CHF1_1 of the first time T1, and may provide a second synthesized channel frame HCF1_C2 of the first time T1 by synthesizing the highlight information HIN with the second channel frame CHF1_2 of the first time T1. In addition, the synthesized channel frame provision unit 100 may provide a third synthesized channel frame HCF1_C3 of the first time T1 by synthesizing the highlight information HIN with the third channel frame CHF1_3 of the first time T1. In the same manner, the synthesized channel frames HCF of the second time T2 to an Nth time may be generated.

The neural network unit 200 may provide a middle frame MF based on the synthesized channel frame HCF and a multi-frame convolution neural network 220 (S200). The behavior recognition result provision unit 300 may provide a behavior recognition result ARR based on a weighted value WT generated according to the middle frame MF and the middle frame MF (S300).

In the operation method for the video-based behavior recognition device 10 according to the present invention, the behavior recognition result ARR is provided based on the synthesized channel frame HCF synthesized from the channel frames CHF provided for the respective channels and the multi-frame convolution neural network 220, thereby more effectively detecting an event occurrence in a video.

In addition, in the operation method for the video-based behavior recognition device 10 according to the present invention, a 3-channel image is converted into a 1-channel image and input to the multi-frame convolution neural network 220 (2D CNN), and thus, the amount of computation for real-time recognition may be reduced by about ⅓ times compared to the 2D CNN of the related art, thereby enhancing the performance of behavior recognition.

Figure 5:
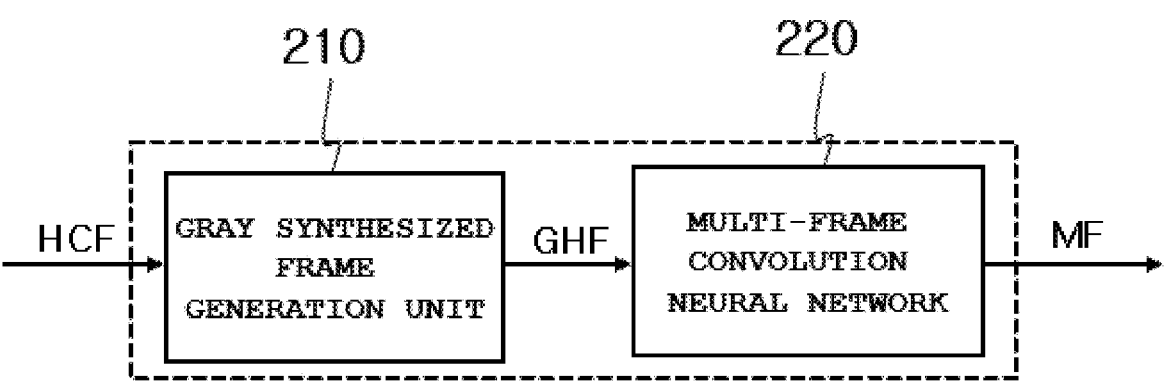
FIG. 5 is a diagram illustrating a neural network unit included in the video-based behavior recognition device of FIG. 2.
Figure 6:
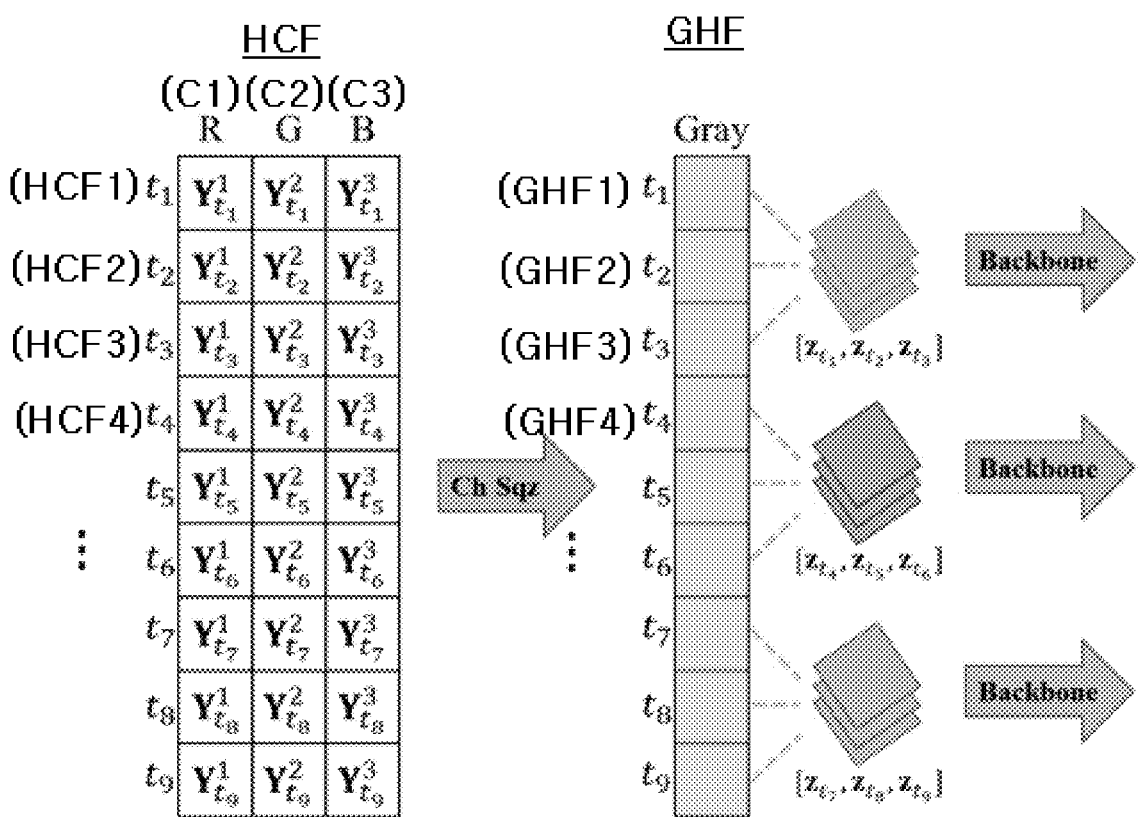
FIG. 6 is a diagram for explaining the operation of a gray synthesized frame generation unit included in the neural network unit of FIG. 5.
Figure 7:
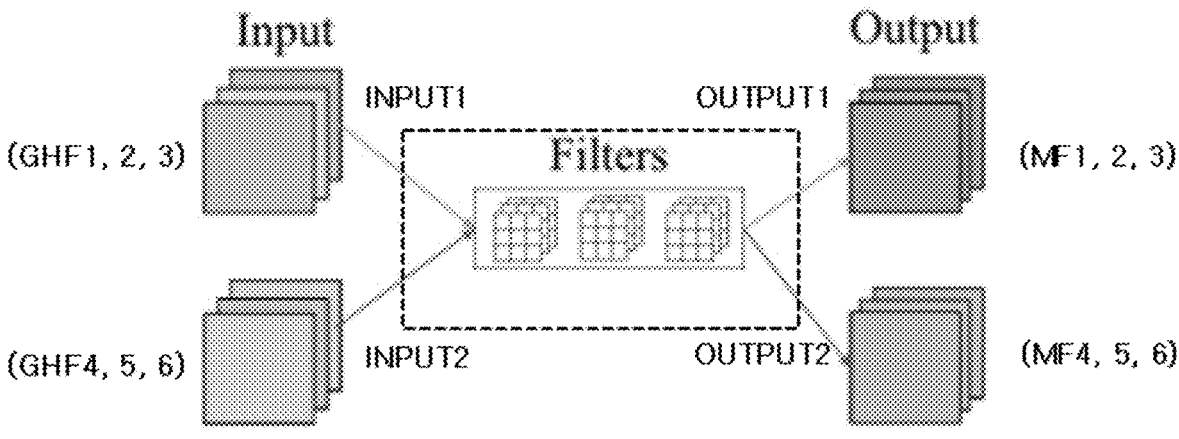
FIG. 7 is a diagram for explaining a multi-frame convolution neural network included in the neural network unit of FIG. 5.

FIG. 5 is a diagram illustrating a neural network unit included in the video-based behavior recognition device of FIG. 2. FIG. 6 is a diagram for explaining the operation of a gray synthesized frame generation unit included in the neural network unit of FIG. 5. FIG. 7 is a diagram for explaining a multi-frame convolution neural network included in the neural network unit of FIG. 5.

Referring to FIGS. 1 to 7, the video-based behavior recognition device 10 according to an embodiment of the present invention may include the synthesized channel frame provision unit 100, the neural network unit 200, and the behavior recognition result provision unit 300. The neural network unit 200 may include a gray synthesized frame generation unit 210 and the multi-frame convolution neural network 220. The gray synthesized frame generation unit 210 may generate a gray synthesized frame GHF by synthesizing the synthesized channel frames HCF respectively corresponding to the plurality of channels. For example, the synthesized channel frame HCF may include the first synthesized channel frame HCF1_C1 of the first time T1, the second synthesized channel frame HCF1_C2 of the first time T1, and the third synthesized channel frame HCF1_C3 of the first time T1. In the case of the second time T2 to the Nth time, the synthesized channel frame HCF may be configured in the same manner.

In addition, although it is disclosed above that the synthesized channel frame provision unit 100 provides the synthesized channel frames HCF for consecutive times, the synthesized channel frame provision unit 100 may skip some of frames received by a camera. For example, if the first time T1 is a first frame of frames received by the camera, the second time T2 may be a sixth frame after five frames.

In this case, the gray synthesized frame generation unit 210 may generate a gray synthesized frame GHF1 of the first time T1 by synthesizing the first synthesized channel frame HCF1_C1 of the first time T1, the second synthesized channel frame HCF1_C2 of the first time T1, and the third synthesized channel frame HCF1_C3 of the first time T1. The gray synthesized frames GHF of the second time T2 to the Nth time may also be generated in the same manner. Here, synthesizing may be performed by summing synthesized frames for each channel, or may be performed by adding weights for each channel and summing synthesized frames.

In an embodiment, the gray synthesized frame generation unit 210 may generate the gray synthesized frame GHF by synthesizing a red synthesized channel frame HCF corresponding to a red channel, a green synthesized channel frame HCF corresponding to a green channel, and a blue synthesized channel frame HCF corresponding to a blue channel. For example, the first synthesized channel frame HCF_C1 may be the red synthesized channel frame, and the second synthesized channel frame HCF_C2 may be the green synthesized channel frame. Also, the third synthesized channel frame HCF_C3 may be the blue synthesized channel frame. The gray synthesized frame generation unit 210 may generate the gray synthesized frame GHF by synthesizing the first synthesized channel frame HCF_C1, the second synthesized channel frame HCF_C2, and the third synthesized channel frame HCF_C3.

In an embodiment, the gray synthesized frame generation unit 210 may generate the gray synthesized frame GHF by synthesizing the red synthesized channel frame, the green synthesized channel frame, and the blue synthesized channel frame corresponding to the respective times among a plurality of times. For example, the plurality of times may include the first time T1, the second time T2, the third time T3, and a fourth time to the Nth time. The gray synthesized frame GHF may include a first gray synthesized frame GHF1 of the first time T1, a second gray synthesized frame GHF2 of the second time T2, a third gray synthesized frame GHF3 of the third time T3, and a fourth gray synthesized frame of the fourth time to an Nth gray synthesized frame of the Nth time.

The gray synthesized frame generation unit 210 may configure the gray synthesized frames GHF corresponding to three consecutive times among the plurality of times as one input unit and provide the one input unit to the multi-frame convolution neural network 220. For example, the three consecutive times among the plurality of times may be the first time T1, the second time T2, and the third time T3. The first gray synthesized frame GHF1, the second gray synthesized frame GHF2, and the third gray synthesized frame GHF3 may be input to a first input INPUT1 of the multi-frame convolution neural network 220, and a fourth gray synthesized frame GHF4, a fifth gray synthesized frame GHF5, and a sixth gray synthesized frame GHF6 may be input to a second input INPUT2 of the multi-frame convolution neural network 220.

The multi-frame convolution neural network 220 may generate a middle frame MF based on the gray synthesized frame GHF. For example, the middle frame MF output to a first output OUTPUT1 of the multi-frame convolution neural network 220 may be a first middle frame MF1, a second middle frame MF2, and a third middle frame MF3, and the middle frame MF output to a second output OUTPUT2 of the multi-frame convolution neural network 220 may be a fourth middle frame MF4, a fifth middle frame MF5, and a sixth middle frame MF6 based on the first gray synthesized frame GHF1 to the sixth gray synthesized frame GHF6.

Figure 8:
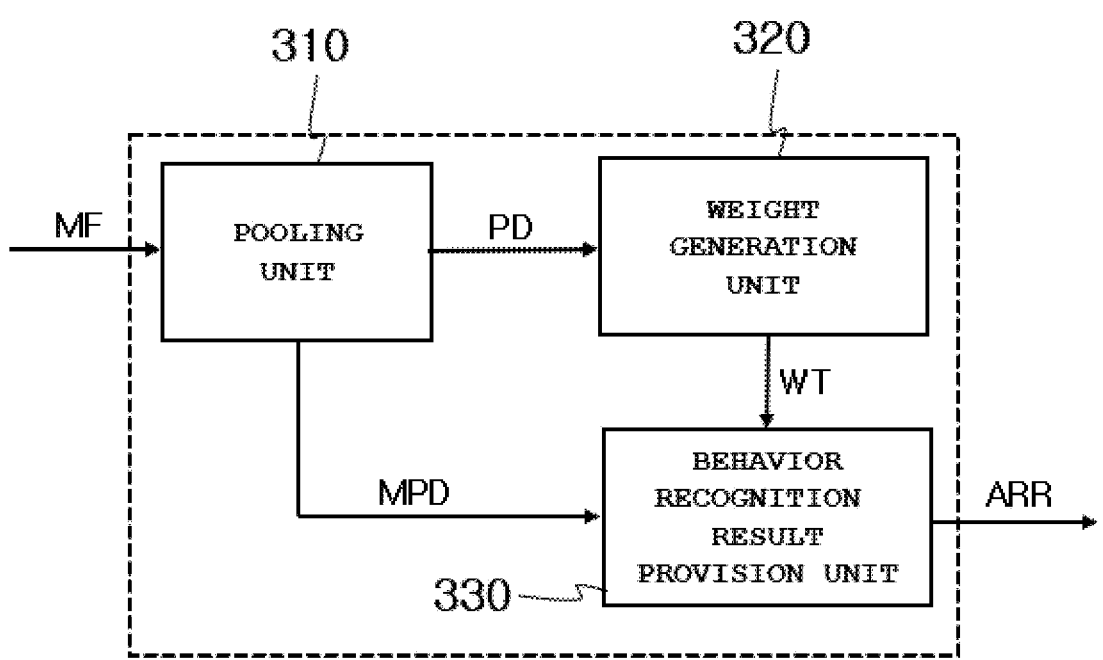
FIG. 8 is a diagram illustrating a behavior recognition result provision unit included in the video-based behavior recognition device of FIG. 2.
Figure 9:
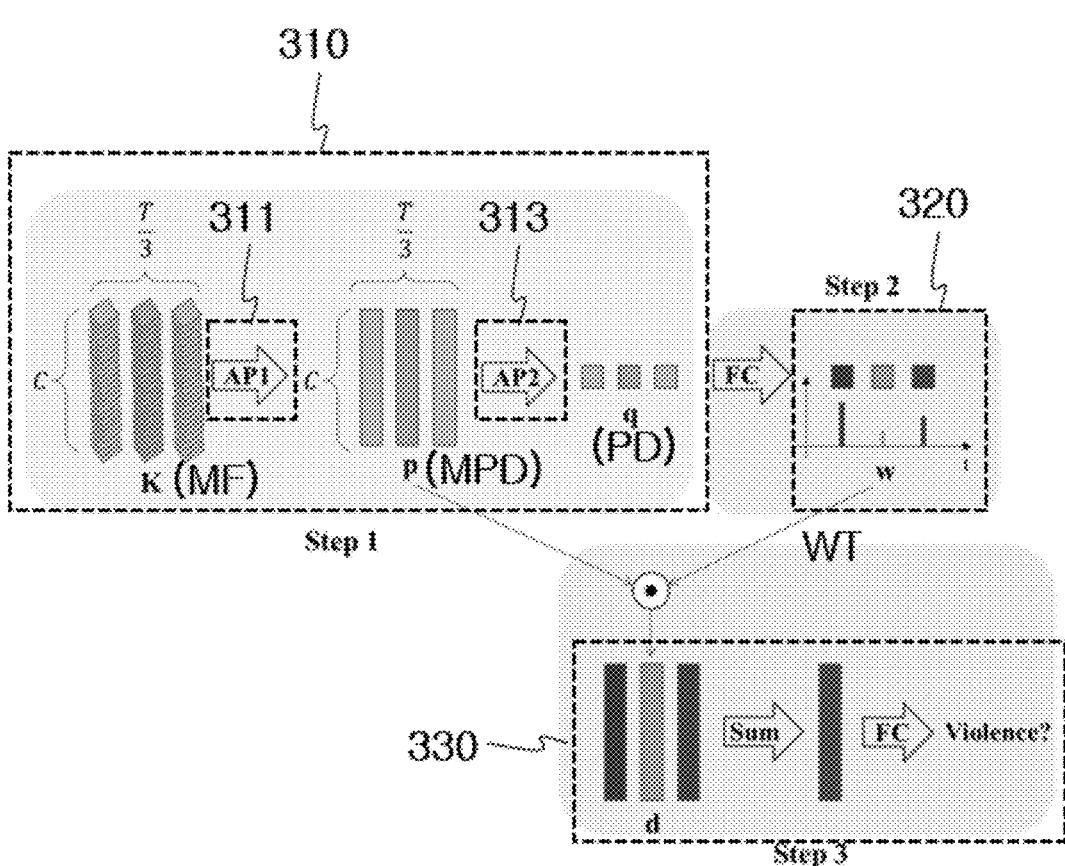
FIG. 9 is a diagram for explaining the behavior recognition result provision unit of FIG. 8.

FIG. 8 is a diagram illustrating a behavior recognition result provision unit included in the video-based behavior recognition device of FIG. 2. FIG. 9 is a diagram for explaining the behavior recognition result provision unit of FIG. 8.

Referring to FIGS. 1 to 9, the video-based behavior recognition device 10 according to an embodiment of the present invention may include the synthesized channel frame provision unit 100, the neural network unit 200, and the behavior recognition result provision unit 300. The behavior recognition result provision unit 300 may include a pooling unit, a weight generation unit 320, and a behavior recognition result unit 330. In an embodiment, the pooling unit 310 may generate pooling data PD by performing average pooling on the middle frame MF, and the pooling data PD may be provided to the weight generation unit 320 including a fully connected layer. The weight generation unit 320 may generate the weighted value WT based on the pooling data PD. The behavior recognition result provision unit 300 may provide the behavior recognition result ARR based on the weighted value WT. The behavior recognition result ARR output from the behavior recognition result provision unit 300 may be used to more effectively detect an event occurrence in a video.

In an embodiment, the behavior recognition result provision unit 300 may include a first pooling unit 311 and a second pooling unit 313. The first pooling unit 311 may generate middle pulling data MPD by performing average pooling on each of the middle frames MF. The second pooling unit 313 may provide the pooling data PD by performing average pooling on the middle pulling data MPD. In addition, in an embodiment, the behavior recognition result provision unit 300 may provide the behavior recognition result ARR based on the middle pulling data MPD and the weighted value WT.

The video-based behavior recognition device 10 according to an embodiment of the present invention may include the synthesized channel frame provision unit 100, the neural network unit 200, and the behavior recognition result provision unit 300. The synthesized channel frame provision unit 100 may generate the highlight information HIN by comparing the channel frames CHF corresponding to respective channels among a plurality of channels, and may provide the synthesized channel frame HCF by synthesizing the channel frames CHF and the highlight information HIN. The neural network unit 200 may provide the middle frame MF based on the synthesized channel frame HCF and the multi-frame convolution neural network 220. The behavior recognition result provision unit 300 may provide the behavior recognition result ARR based on the weighted value WT generated according to the middle frame MF and the middle frame MF.

In the video-based behavior recognition device 10 according to the present invention, the behavior recognition result ARR is provided based on the synthesized channel frame HCF synthesized from the channel frames CHF provided for the respective channels and the multi-frame convolution neural network 220, thereby more effectively detecting an event occurrence in a video.

In addition, in the operation method for the video-based behavior recognition device 10 according to the present invention, a 3-channel image is converted into a 1-channel image and input to the multi-frame convolution neural network 220 (2D CNN), and thus, the amount of computation for real-time recognition may be reduced by about ⅓ times compared to the 2D CNN of the related art, thereby enhancing the performance of behavior recognition.

Figure 11:
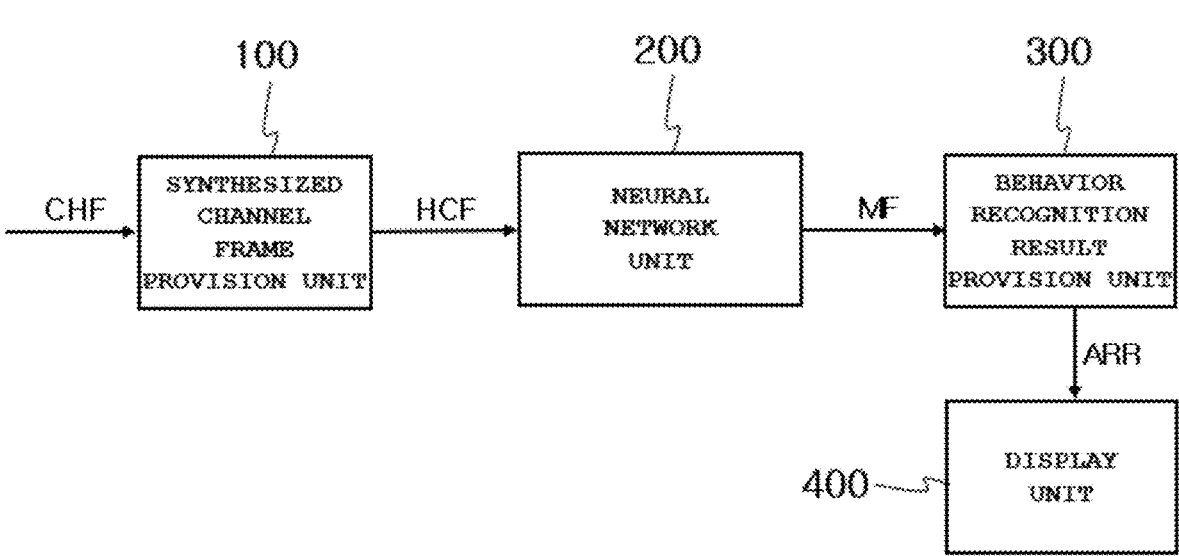
FIG. 11 is a diagram illustrating a video-based behavior recognition system according to embodiments of the present invention.

FIG. 10 is a flowchart illustrating an operation method of a video-based behavior recognition system according to embodiments of the present invention. FIG. 11 is a diagram illustrating a video-based behavior recognition system according to embodiments of the present invention.

Referring to FIGS. 1 to 11, in the operation method for the video-based behavior recognition system according to an embodiment of the present invention, the synthesized channel frame provision unit 100 may generate the highlight information HIN by comparing the channel frames CHF corresponding to respective channels among a plurality of channels, and provide the synthesized channel frame HCF by synthesizing the channel frames CHF and the highlight information HIN (S100). The neural network unit 200 may provide the middle frame MF based on the synthesized channel frame HCF and the multi-frame convolution neural network 220 (S200). The behavior recognition result provision unit 300 may provide the behavior recognition result ARR based on the weighted value WT generated according to the middle frame MF and the middle frame MF (S300). A display unit 400 may display notification information generated according to the behavior recognition result ARR (S400).

In an embodiment, the neural network unit 200 may include the gray synthesized frame generation unit 210 and the multi-frame convolution neural network 220. The gray synthesized frame generation unit 210 may generate the gray synthesized frame GHF by synthesizing the synthesized channel frames HCF respectively corresponding to a plurality of channels. The multi-frame convolution neural network 220 may generate the middle frame MF based on the gray synthesized frame GHF.

The video-based behavior recognition system according to an embodiment of the present invention may include the synthesized channel frame provision unit 100, the neural network unit 200, the behavior recognition result provision unit 300, and the display unit 400. The synthesized channel frame provision unit 100 may generate the highlight information HIN by comparing the channel frames CHF corresponding to respective channels among a plurality of channels, and provide the synthesized channel frame HCF by synthesizing the channel frames CHF and the highlight information HIN. The neural network unit 200 may provide the middle frame MF based on the synthesized channel frame HCF and the multi-frame convolution neural network 220. The behavior recognition result provision unit 300 may provide the behavior recognition result ARR based on the weighted value WT generated according to the middle frame MF and the middle frame MF. The display unit 400 may display notification information generated according to the behavior recognition result ARR. In an embodiment, the plurality of channels may include the first channel C1, the second channel C2, and the third channel C3. The first channel C1 may be a red channel, the second channel C2 may be a green channel, and the third channel C3 may be a blue channel.

In the video-based behavior recognition system according to the present invention, the behavior recognition result ARR is provided based on the synthesized channel frame HCF synthesized from the channel frames CHF provided for the respective channels and the multi-frame convolution neural network 220, thereby more effectively detecting an event occurrence in a video.

In addition, in the operation method for the video-based behavior recognition system according to the present invention, a 3-channel image is converted into a 1-channel image and input to the multi-frame convolution neural network 220 (2D CNN), and thus, the amount of computation for real-time recognition may be reduced by about ⅓ times compared to the 2D CNN of the related art, thereby enhancing the performance of behavior recognition.

Referring to FIGS. 1 to 11, in the operation method for the video-based behavior recognition device 10 according to the present invention, the synthesized channel frame HCF may be channel frames CHF corresponding to the respective channels, and may be a frame generated by synthesizing the channel frames CHF and the highlight information HIN. The neural network unit 200 may provide the middle frame MF based on the synthesized channel frame HCF. The behavior recognition result provision unit 300 may provide the behavior recognition result ARR based on the middle frame MF. The synthesized channel frame provision unit 100 may be a frame provision unit or an input frame provision unit.

In addition to the technical problem of the present invention mentioned above, other features and advantages of the present invention will be described below or will be clearly understood by those of ordinary skill in the art from such description and explanation.

The invention claimed is:

1. A video-based behavior recognition system comprising:
a processor configured to generate highlight information by comparing channel frames corresponding to respective channels among a plurality of channels, and to provide a synthesized channel frame by synthesizing the channel frames and the highlight information;
a processor configured to provide a middle frame based on the synthesized channel frame and a multi-frame convolution neural network;
a processor configured to provide behavior recognition result based on the middle frame and a weighted value generated according to the middle frame; and
a processor configured to display notification information generated according to the behavior recognition result.

2. The video-based behavior recognition system of claim 1, wherein the plurality of channels comprises a first channel, a second channel, and a third channel, wherein the first channel is a red channel, the second channel is a green channel, and the third channel is a blue channel.

3. The video-based behavior recognition system of claim 1, wherein the processor configured to provide a middle frame comprises:
a processor configured to generate gray synthesized frame by synthesizing the synthesized channel frames respectively corresponding to the plurality of channels; and
a processor configured to generate the middle frame based on the gray synthesized frame.

4. The video-based behavior recognition device of claim 3, wherein the processor configured to provide the middle frame generates a gray synthesized frame by synthesizing the synthesized channel frames respectively corresponding to the plurality of channels.

5. An operation method for the video-based behavior recognition system of claim 1 comprising:
(i) generating highlight information by comparing channel frames corresponding to respective channels among a plurality of channels, and providing a synthesized channel frame by synthesizing the channel frames and the highlight information;
(ii) providing a middle frame based on the synthesized channel frame and a multi-frame convolution neural network; and
(iii) providing a behavior recognition result based on the middle frame and a weighted value generated according to the middle frame result.

6. The operation method of claim 5:
wherein,
in step (i), the frame of channels is a 3-channel frame; and
in step (ii), the middle frame is based on the 3-channel frame.

7. The operation method of claim 6:
wherein,
in step (i), the highlight information is generated by comparing channel frames corresponding to respective channels among a plurality of channels, and providing a frame by synthesizing the channel frames and the highlight information.

8. A video-based behavior recognition device comprising the video-based behavior recognition system of claim 1.

9. The operation method of claim 5 further comprising:
(iv) displaying notification information generated according to the behavior recognition result.

10. The operation method of claim 9, wherein the behavior recognition result is obtained based on the middle pulling data and the weighted value.

11. The operation method of claim 5, wherein, in step (i), the synthesized channel frame is a gray channel synthesized frame generated by synthesizing the synthesized channel frames corresponding to the plurality of channels; and in step (ii), the middle frame is provided based on the gray synthesized frame.

12. The operation method of claim 11, wherein the plurality of channels comprise a first channel, a second channel, and a third channel, wherein the first channel is a red channel, the second channel is a green channel, and the third channel is a blue channel.

13. The operation method of claim 12, wherein the gray synthesized frame generation unit generates the gray synthesized channel frame by synthesizing a red synthesized channel frame corresponding to the red channel, a green synthesized channel frame corresponding to the green channel, and a blue synthesized channel frame corresponding to the blue channel.

14. The operation method of claim 5, wherein the gray synthesized frame generation unit generates the gray synthesized frame by synthesizing the red synthesized channel frame, the green synthesized channel frame; and the blue synthesized channel frame, respectively, corresponding to a plurality of times, configures the gray synthesized frames corresponding to three consecutive times among the plurality of times as one input unit, and provide the one input unit to the multi-frame convolution neural network.

15. The operation method of claim 5, wherein the behavior recognition result provision unit generates pooling data by performing average pooling on the middle frame, generates the weighted value based on the pooling data, and provides the behavior recognition result based on the weighted value.

16. The operation method of claim 5, wherein the behavior recognition result provision unit comprises a first pooling unit generating middle pulling data by performing average pooling on each of the middle frames; and a second pooling unit providing the pooling data by performing average pooling on the middle pulling data.

* * * * *